United States Patent
Chang et al.

(10) Patent No.: US 7,265,180 B2
(45) Date of Patent: Sep. 4, 2007

(54) THERMOPLASTIC MOLDING COMPOSITION HAVING HIGH CLARITY

(75) Inventors: Moh-Ching O. Chang, Wexford, PA (US); Chuan-Ju Chen, Cranberry Township, PA (US)

(73) Assignee: LANXESS Corporation, Pittsburgh, PA (US)

( * ) Notice: Subject to any disclaimer, the term of this patent is extended or adjusted under 35 U.S.C. 154(b) by 0 days.

(21) Appl. No.: 10/676,925

(22) Filed: Oct. 1, 2003

(65) Prior Publication Data

US 2005/0075455 A1    Apr. 7, 2005

(51) Int. Cl.
*C08L 53/02* (2006.01)
(52) U.S. Cl. .............. 525/93; 525/94; 525/98
(58) Field of Classification Search .......... 525/94, 525/98, 93
See application file for complete search history.

(56) References Cited

U.S. PATENT DOCUMENTS

| | | | | |
|---|---|---|---|---|
| 5,180,535 A | * | 1/1993 | Yamaoka et al. | 264/328.16 |
| 5,879,596 A | * | 3/1999 | Roach | 264/28 |
| 5,905,118 A | * | 5/1999 | Padwa | 525/188 |
| 5,973,074 A | * | 10/1999 | Campbell et al. | 525/125 |
| 6,040,370 A | * | 3/2000 | Wozny et al. | 524/394 |
| 6,040,382 A | * | 3/2000 | Hanes | 525/98 |

OTHER PUBLICATIONS

Iranian Journal of Polymer Science and Technology, vol. 4, No. 3, (month unavailable) 1995, XP008041111, pp. 21-216, J. K. Kim, "The Effect of Acrylonitrile Content of Styrene-Acrylonitrile Copolymer on Styrene-Acrylonitrile/Styrene-Butadiene-Styrene Alloy System".

* cited by examiner

*Primary Examiner*—Jeffrey Mullis
(74) *Attorney, Agent, or Firm*—Jennifer R. Seng

(57) ABSTRACT

A clear and ductile thermoplastic molding composition containing (i) a styrene copolymer and (ii) a rubber component is disclosed. The styrene copolymer is represented by styrene-acrylonitrile copolymer and the rubber component is a styrene-butadiene-styrene (SBS) block copolymer. Characterized by its low haze, high light transmission, good processability and mechanical properties the composition is suitable for making a variety of useful articles.

9 Claims, No Drawings

THERMOPLASTIC MOLDING COMPOSITION HAVING HIGH CLARITY

FIELD OF THE INVENTION

The invention relates to thermoplastic molding compositions and in particular to compositions based on styrene.

SUMMARY OF THE INVENTION

A clear and ductile thermoplastic molding composition containing (i) a styrene copolymer and (ii) a rubber component is disclosed. The styrene copolymer is represented by styrene-acrylonitrile copolymer and the rubber component is a styrene-butadiene-styrene (SBS) block copolymer. Characterized by its low haze, high light transmission, good processability and mechanical properties, the composition is suitable for making a variety of useful articles.

DETAILED DESCRIPTION OF THE INVENTION

The thermoplastic molding composition of the invention contains
(i) a styrene copolymer and
(ii) a rubber component.

It is characterized by its low haze, high light transmission, good processability and ductility.

The styrene copolymer of the invention is derived from (A.1) that is at least one member selected from the group consisting of styrene, nucleus-substituted styrene, and methyl methacrylate and (A.2), that is at least one member selected from the group consisting of acrylonitrile, methyl methacrylate, maleic anhydride, N-alkyl-substituted maleic imide and N-aryl-substituted maleic imide. The number average molecular weight of the copolymer is 30 to 120, preferably 40 to 100 kg/mole and its weight average molecular weight is 60 to 240, preferably 80 to 210 kg/mole. The content of A.2 in the copolymer is 10 to 27.5%, preferably 15 to 27%, relative to the weight of the copolymer.

In the preferred embodiments, the styrene copolymer is a copolymer of styrene with acrylonitrile, optionally with methyl methacrylate or a copolymer of α-methyl styrene with acrylonitrile, optionally with methyl methacrylate or a copolymer of styrene and α-methyl styrene with acrylonitrile, optionally with methyl methacrylate.

The styrene copolymer is known and the methods for its preparation, for instance, by radical polymerization, more particularly by emulsion, suspension, solution and bulk polymerization are also well documented in the literature.

The rubber component of the inventive composition is a styrene-butadiene-styrene (SBS) block copolymer. It is characterized in its butadiene content in the range of 20 to 30, preferably 23 to 27, most preferably 25 percent relative to the weight of the copolymer.

A particularly suitable rubber component is available commercially from Kraton Polymers under the trade designation of Kraton D1403 P and Kraton D1494 P. These are characterized in that their butadiene content is about 25% and in that their Shore A (10 s) hardness values are 64 and 67, respectively.

The inventive composition contains 1 to 99, preferably 5 to 95 percent of the styrenic copolymer and 99 to 1, preferably 99 to 5 percent of the rubber component, the percents being relative to the total weight of these components.

In a preferred embodiment, the composition is characterized in that it contains no rubber components other than said (ii). In a still further preferred embodiment, the composition is characterized in that its haze value is not greater than 15, preferably no greater than 13% and in that its transmittance is greater than 87, preferably greater than 88%.

The composition of the invention may advantageously contain other additives that are known for their effect in the context of styrenic-based molding compositions including such as plasticizers, antioxidants, stabilizers, flame-retardants, fibers, mineral fibers, mineral fillers, dyes, pigments and the like.

The preparation of the inventive composition follows conventional procedures which are well known in the art. Usually, however, they are extrusion blended or compounded in a high intensity blender such as a Banbury Mixer or twin-screw extruder.

Articles made of the inventive composition are characterized by their high light transmittance and low haze values. Additionally, the composition features good thermal and mechanical properties.

The invention is now described with reference to the following examples, which are for the purposes of illustration only and are not intended to imply any limitation on the scope of the invention.

EXAMPLES

Compositions demonstrating the invention have been prepared and articles made therefrom were evaluated as described below. Compounding was carried out in a twin-screw extruder, Leistritz at 250 rpm. The actual melt temperature was about 250 to 260° C.

The test specimens were prepared by injection molding, Cincinnati Milacron, Boboshot 110T. The melt temperature was set at 475° F. for Zones 1, 2, 3 and the nozzle. The mold temperature was set at 130° F.

The components of the compositions:

"SAN-1" refers to a copolymer of styrene and acrylonitrile having 17 wt. % acrylonitrile, number-average molecular weight of 82 kg/mole and weight-average molecular weight of 185 kg/mol.

"SAN-2" refers to a copolymer of styrene and acrylonitrile having 23 wt. % acrylonitrile, number-average molecular weight of 72 kg/mole and weight-average molecular weight of 163 kg/mol.

"SAN-3" refers to a copolymer of styrene and acrylonitrile having 33 wt. % acrylonitrile, number-average molecular weight of 66 kg/mole and weight-average molecular weight of 146 kg/mol.

"K-1" refers to a tri-block polystyrene-polybutadiene-polystyrene copolymer containing 25 wt. % polybutadiene, Kraton D1403 P (Shore A Hardness=64) available from Kraton Polymers.

"K-2" refers to a tri-block polystyrene-polybutadiene-polystyrene copolymer containing 25 wt. % polybutadiene, Kraton D1494 P (Shore A Hardness=67) available from Kraton Polymers.

The compositions shown below contained 0.1 parts per hundred parts of resin of a conventional antioxidant believed to have no criticality to the invention.

The determinations of Haze and transmittance were carried out in accordance with ASTM D 1003, the test specimens were of 0.100" in thickness.

Melt flow index (MFI)—was determined in accordance with ASTM D 1238, (200° C., 5 Kg).

Vicat temperature was determined according to ASTM D1525, under 1 Kg. load. The temperature of the oil increased at a rate of 2° C./min.

Impact strength—unnotched impact at room temperature, ft-lb/in (⅛")—In accordance with ASTM D4812. The test specimen size was 6.35 cm×1.27 cm×⅛".

Tensile properties were determined at room temperature using an Instron Universal Machine with cross-head speed of 50 mm/minute in accordance with ASTM D-638.

TABLE 1

|  | Comp. | 1 | 2 | 3 | 4 | 5 | 6 |
|---|---|---|---|---|---|---|---|
| K-1 |  | 50.0 | 50.0 | 50.0 |  |  |  |
| K-2 |  |  |  |  | 50.0 | 50.0 | 50.0 |
| SAN-1 |  | 50.0 |  |  | 50.0 |  |  |
| SAN-2 | 100.0 |  | 50.0 |  |  | 50.0 |  |
| SAN-3 |  |  |  | 50.0 |  |  | 50.0 |
| Properties |  |  |  |  |  |  |  |
| HAZE, % | 0.5 | 30.0 | 12.0 | 80.4 | 16.0 | 9.7 | 72.9 |
| Transmittance, % | 90.3 | 89.2 | 90.7 | 87.6 | 90.0 | 90.5 | 87.5 |
| MFI, g/10 min. | 1.8 | 9.2 | 8.9 |  | 8.3 | 7.6 |  |
| Vicat, ° C. | 108.0 | 101.8 | 101.6 |  | 102.3 | 102.5 |  |
| Tensile Strength at yield, psi | 10114 (B)* | 6830 | 7030 |  | 7020 | 7141 |  |
| Elongation at yield, % | No Yield | 2.8 | 3.4 |  | 2.7 | 3.5 |  |
| Elongation at break, % | 2.4 | 14.0 | 15.0 |  | 3.3 | 10.8 |  |
| Tensile Modulus, Kpsi | 471 | 361 | 377 |  | 360 | 345 |  |

*B - means break.

In comparison with the comparative example (Comp.) that contains solely SAN-2, and in comparison to corresponding examples that contain SAN copolymers that are outside the scope of the invention, the compositions demonstrative of the invention (Examples 2 and 5) show markedly improved optical and mechanical properties.

TABLE 2

|  | C1 | C2 | 8 | 9 | 10 | 11 | 12 | 13 | 14 | 15 | 16 |
|---|---|---|---|---|---|---|---|---|---|---|---|
| K-2 |  | 100.0 | 20.0 | 40.0 | 50.0 | 60.0 | 70.0 | 80.0 | 80.0 | 80.0 | 90.0 |
| SAN-1 |  |  |  |  |  |  |  |  | 10.0 |  |  |
| SAN-2 | 100.0 |  | 80.0 | 60.0 | 50.0 | 40.0 | 30.0 | 20.0 | 10.0 | 10.0 | 10.0 |
| SAN-3 |  |  |  |  |  |  |  |  |  | 10.0 |  |
| Properties |  |  |  |  |  |  |  |  |  |  |  |
| HAZE, % | 0.5 | 2.7 | 1.0 | 5.9 | 9.7 | 12.7 | 8.9 | 7.8 | 1.3 | 48.4 | 4.3 |
| Transmittance, % | 90.3 | 89.4 | 90.2 | 89.9 | 89.5 | 89.4 | 89.6 | 89.5 | 88.9 | 86.8 | 89.4 |
| MFI, g/10 min. | 1.8 | 9.9 | 2.6 | 6.7 | 7.6 | 9.3 | 10.1 | 10.2 | 9.5 | 10.0 | 10.3 |
| Vicat, ° C. | 108.0 | 89.6 | 106.2 | 103.9 | 102.5 | 98.8 | 96.2 | 93.8 | 92.8 | 93.7 | 91.1 |
| Impact Strength, ft-lb/in | 3.7 | 25.9 | 3.8 | 4.6 | 4.9 | 5.0 | 5.4 | 11.5 | 7.5 | 31.9 | 26.2 |
| Tensile strength at yield, psi | 10114 (B) | 3910 | 9438 (B) | 7628 (B) | 7141 | 6158 | 5404 | 4835 | 4891 | 4888 | 4270 |
| Elongation at yield, % | NY** | 2.1 | NY** | NY** | 3.5 | 3.7 | 3.2 | 2.7 | 2.9 | 2.6 | 2.6 |
| Elongation at break, % | 2.4 | 90 | 2.8 | 3.3 | 11 | 22 | 27 | 35 | 49 | 48 | 66 |
| Tensile Modulus, Kpsi | 471 | 206 | 433 | 361 | 345 | 299 | 269 | 245 | 254 | 258 | 227 |

**NY - denotes no yield.

In comparison to the comparative example C1, all examples, except for Example 15, show the advantageous optical and mechanical properties that characterize the inventive composition.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition consisting essentially of:
   (i) a copolymer having a number average molecular weight of 30 to 120 kg/mole and weight average molecular weight of 60 to 240 that is a product of polymerization of
      (A.1) at least one member selected from the group consisting of styrene, nucleus-substituted styrene, and methyl methacrylate and
      (A.2) at least one member selected from the group consisting of acrylonitrile, maleic anhydride, N-alkyl-substituted maleic imide and N-aryl-substituted maleic imide, and
   (ii) a styrene-butadiene-styrene (SBS) block copolymer having butadiene content of 20 to 30 percent relative to its weight,
   wherein the content of (A.2) in the copolymer is 19 to 27.5% relative to the weight of the copolymer; and
   wherein the composition has a haze value not greater than 15% and a transmittance greater than 87%.

2. The composition of claim 1 wherein the copolymer has a number average molecular weight of 40 to 100 kg/mole and its weight average molecular weight is 80 to 210 kg/mole.

3. The composition of claim 1 wherein the content of (A.2) in the copolymer 15 to 27%.

4. The composition of claim 1 wherein (A.1) is styrene and (A.2) is acrylonitrile.

5. The composition of claim 4 wherein the polymerization product further contains structural units derived from methyl methacrylate.

6. The composition of claim 1 wherein the butadiene content is 23 to 27 percent.

7. The composition of claim 1 wherein said copolynier is present in an amount of 1 to 99 percent relative to the total weight of the copolymer and the SBS.

8. A thermoplastic molding composition consisting essentially of:
   (i) a copolymer having a number average molecular weight of 30 to 120 kg/mole and weight average molecular weight of 60 to 240 that is a product of polymerization of
      (A.1) at least one member selected from the group consisting of styrene, nucleus-substituted styrene, and methyl methacrylate and
      (A.2) at least one member selected from the group consisting of acrylonitrile, maleic anhydride, N-alkyl-substituted maleic imide and N-aryl-substituted maleic imide, and
   (ii) a rubber component in the form of a styrene-butadiene-styrene (SBS) block copolymer having butadiene content of 20 to 30 percent relative to its weight,
   wherein the content of (A.2) in the copolymer is 19 to 27.5% relative to the weight of the copolymer, the composition characterized in that it includes no rubber components additional to said (ii); and
   wherein the coposition has a haze value not reater than 15% and a transmittance greater than 87%.

9. A thermoplastic molding composition consisting essentially of:
   (i) a copolymer having a number average molecular weight of 30 to 120 kg/mole and weight average molecular weight of 60 to 240 that is a product of polymerization of
      (A.1) at least one member selected from the group consisting of styrene, nucleus-substituted styrene, and
      (A.2) at least one member selected from the group consistIng of acrylonitrile, maieic anhyciride, N-alkyl-substituted maleic imide and N-aryl-substituted maleic imide, and
   (ii) a styrene-butadiene-styrene (SBS) block copolymer having butadiene content of 20 to 30 percent relative to its weight,
   wherein the content of (A.2) in the copolymer is 19 to 27.5% relative to the weight of the copolymer, the composition being characteuized In that its haze value is not greater than 15% and in that its transmittance is greater than 87%.

* * * * *